Dec. 6, 1966     C. NORTON     3,289,305

RAFTER MEASURING TAPE

Filed Jan. 4, 1965

INVENTOR.
CLAUD NORTON
BY *Martin L. Stoneman*

United States Patent Office 3,289,305
Patented Dec. 6, 1966

3,289,305
RAFTER MEASURING TAPE
Claud Norton, 2493 Seventh Ave., Yuma, Ariz.
Filed Jan. 4, 1965, Ser. No. 423,115
5 Claims. (Cl. 33—137)

This invention relates generally to measuring tapes of the type including a tape reel enclosed in a case and a flexible metal tape mounted on the reel and housed within the case.

More particularly, it relates to a measuring tape specifically designed for measuring rafters for rough construction.

When a carpenter is laying out the roof of a building having a structure with a wooden frame, particularly when he is laying out what is termed a "hip roof," the carpenter must determine the length of each rafter in the roof in accordance with the layout of the roof, including the "pitch" of the roof.

In the trade of carpentry, the pitch angle, or "pitch," of the roof, i.e. the angle which a specific roof surface makes with the horizontal, is referred to by calling out the ratio of the vertical height of the roof, in feet, above a horizontal plane at a point 12-feet from the intersection of the roof line with said horizontal plane. Thus a pitch will be called off as: 1–12, 1½–12, 2–12, etc., the larger the ratio, the larger the angle.

A "hip roof" refers to a roof in which the adjacent roof slopes meet each other, or a truncated roof, or gable.

From the edge of the roof to the hip or valley rafter at the intersection of two adjacent roof slopes, jack rafters are set in, running from the roof edge to the hip or valley rafter, at two foot intervals, to form the rib portion of the roof structure. Therefore, it can be readily seen that the jack rafter at the outer corner of the roof structure would be of shorter length than the subsequent jack rafters. The measurement of jack rafter and other rafter cuts is now a difficult practical problem.

Presently, carpenters or rafter men, in order to determine the length of each jack rafter (or common rafter, or hip rafter, or valley rafter), have to employ the mathematical formula—the hypotenuse equals the square root of the sum of the sides squared—or refer to tables provided for this purpose. Since this is somewhat confusing and time consuming, there are relatively few good rafter men.

The present invention comprises a rafter measuring tape, so novel and uniquely designed that even an apprentice, with a minimum of instruction, can become an expert rafter man.

Therefore, it is a principal object and feature of this invention to provide a tape having a construction and indicia of such character as to allow the accurate measurement of jack rafters and other rafter cuts.

It is another object and feature of this invention to provide a rafter measuring tape of such construction as to allow even an inexperienced man to cut jack rafters speedily and accurately.

It is still another object and feature of this invention to provide a tape measure that is of maximum practical use for measuring the rafter cuts employed in building roofs, that is, common rafters, hip rafters, valley rafters, valley jacks, hip jacks, and hip and valley jacks.

Yet another object and feature of this invention is to provide a rafter measuring tape having a moveable slide of preferred construction which can be locked at a set position and is adapted to catch on the end of a rafter to serve as a commencing point for the measurements to be made.

Other objects, features, and advantages will be readily apparent from the following description taken in connection with the accompanying drawings, in which.

Figure 1:
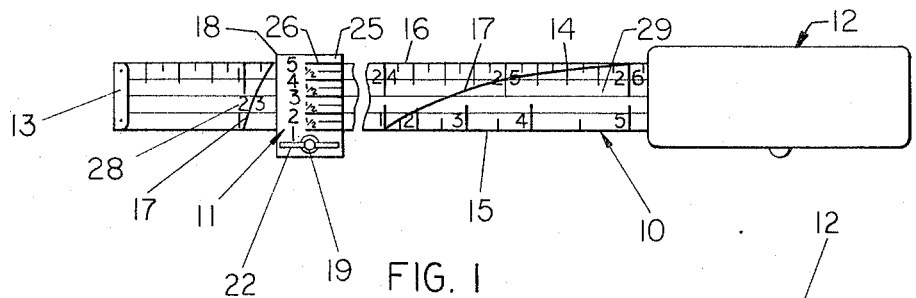
FIGURE 1 is a plan view of a preferred embodiment of the rafter measuring tape of the present invention showing two portions of said tape in detail.
Figure 2:
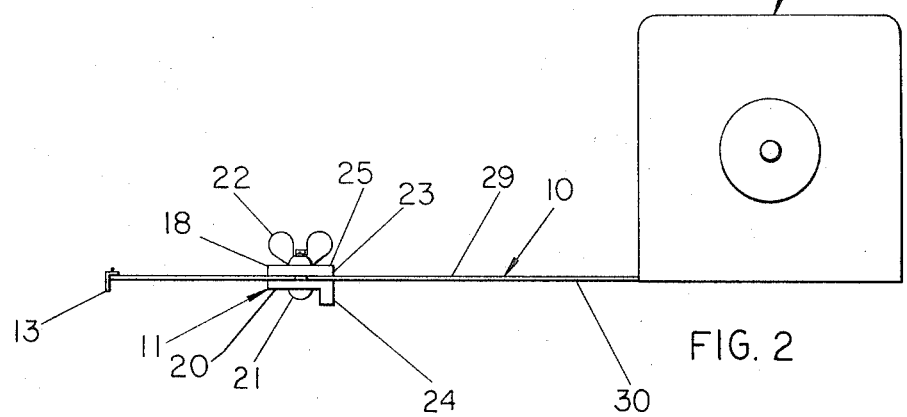
FIGURE 2 is a side elevation view of said preferred embodiment of the rafter measuring tape of the present invention.

Referring to the drawings more particularly, the illustrated embodiment of the rafter measuring tape of the present invention includes three major parts: the tape 10, the slide 11, and the container and tape reel 12. Riveted to the end of tape 10, which is made of a metallic material, is an L-shaped catch 13. The markings or indicia 14 on tape 10 commence at this point. The first twenty-four inches of the face side 29 of tape 10 are calibrated in the standard measurements of inches, broken down in ⅛" marks. Twenty-four curved pitch lines 17, preferably of a different color than the aforementioned markings and extending obliquely upwardly therefrom, fingerings 14, are scribed on face side 29, one pitch line 17 corresponding roughly to each of the first twenty-four inch-marks. Each pitch line 17 commences at the lower edge 15 of tape 10, almost directly below a corresponding one of said twenty-four inch-marks, and curves upwardly and to the right to the upper edge 16 of tape 10. Pitch line 17 generates a very short arc at the one-inch mark as compared to the arc generated at the 2-foot mark. The significance of pitch line 17 will be explained in fuller detail as the description proceeds.

Slide 11 consists of U-shaped member 18, the open end of which includes a hole 19 into which is inserted from the bottom side 20 of U-shaped member 18 a threaded stud 21 that is capped by a wing-nut 22. When wing-nut 22 is fastened tightly on threaded stud 21 with tape 10 inserted in between the arms of U-shaped member 18, a clamping action is evoked, thus fixing slide 11 at a fixed position on tape 10. Also, on the bottom side 20 of slide 11 in line with the leading edge 23 of the topside 25 of slide 11 is perpendicular member 24 which acts as a catch. Scribed on both the topside 25 and the bottom side 20 (not shown) of slide 11 in the area corresponding to the width of tape 10 are the pitch graduations 26. The pitch graduations 26 are divided into 9 equal graduations; the 5 major graduations indicating the whole pitch; the 4 minor graduations indicating the ½ pitch marks. The pitch graduations 26, numbered 1 thru 5, begin their ascending order from the bottom edge 15 of tape 10 on both sides of slide 11.

The container and tape reel 12 is of the common, spring-loaded ratchet, push-button, retract type with the capabilities of holding a 16-foot tape for use in home building.

Figure 3:
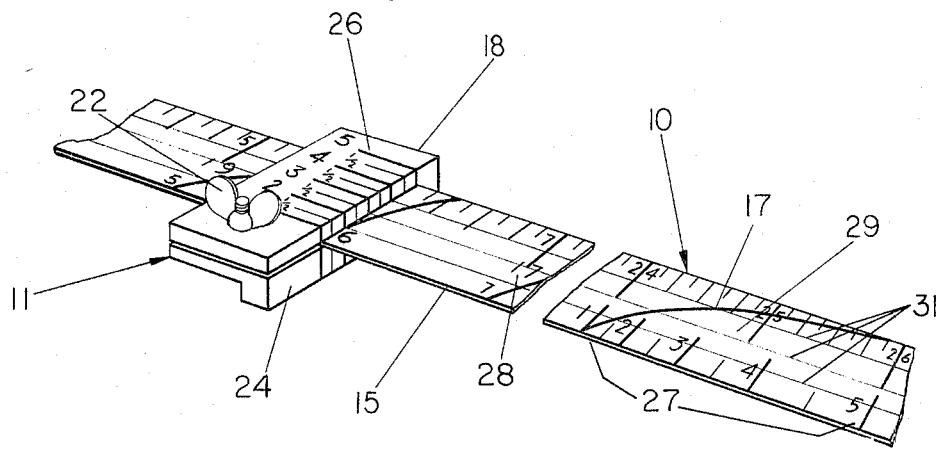
FIGURE 3 is a perspective close-up view of portions of said preferred embodiment illustrating in detail the slide member and scribed indicia on the tape.

In addition to the aforementioned parts, referring now to FIGURE 3, starting at the 24" mark along the bottom edge 15 of tape 10 and continuing at pre-determined intervals to the termination of tape 10 are scribed cutting marks 27, preferably of the same color as pitch line 17. The cutting marks 27 are of the same breakdown as the pitch graduations 26 on slide 11, that is, major graduations 1 thru 5 and 4 minor graduations as half-marks, only cutting marks 27 run along the same longitudinal direction as tape 10, as shown clearly in FIGURE 3.

It should be noted that commencing beyond the 24" mark along the upper edge 16 of tape 10 are cutting marks (not shown) similar in make-up but not scale to cutting marks 27. These cutting marks also extend to the end of tape 10. The purpose of these cutting marks will be explained in the ensuing description.

Those familiar with the art of roof building know that roof rafters are spaced at 2-foot intervals and also that not all roof dimensions are evenly divisible by 2; consequently, there are "odd inches" left over. It is the practice to space rafters at these even 2-foot intervals from the center of the roof so that the "short" spacing is at the outer corners of the house rather than the rafters at the center. For a hip roof, the prescribed conditions are further complicated by the fact that the jack rafters necessary are each different lengths, depending upon the pitch and various dimensions involved, from the corner of the house to the common rafter length.

In the following descriptive example, one familiar with the state of the art will readily see the advantages of the present invention in terms of speed, accuracy and simplicity of use. Assuming a hip roof section of 13½ feet horizontally from the common rafter leading to the apex of the roof to the corner of the house, with 2-foot spacing between the jack rafters, there will be six jack rafters and 18 inches left over as odd inches. Assume the pitch is 4–12. Having determined this 18 odd inches left over, the rafter man will then move slide 11 along tape 10 until the number 4 graduation on slide 11 exactly meets with the pitch line 17 located six inches from the beginning of tape 10 and 18 inches from the 24" mark (marked as the 6"–18" pitch line). Slide 11 is then made secure with wing-nut 22. It should be noted that slide 11 is preferably made to be exactly ¾" wide to compensate automatically for the normal 1½" center beam width. The 18" mark of the 6"–18" graduation just referred to is one of the declining graduation marks 28. Commencing with number 1 on the bottom edge 15 of tape 10 at the 23" mark and terminating with the number 23 at the 1" mark are these declining graduation marks 28, each corresponding to a pitch line 17. They are merely a reverse countdown of the first 24" for facilitating the speedy placement of slide 11. The "left over odd inches," in this case 18", is subtracted from 24" leaving a balance of 6"; thus, the meaning of the 6"–18" pitch line. It is readily apparent that this same procedure in setting slide 11 would be followed with any pitch between 1–12 and 5–12 and any number of left over odd inches.

It should be noted that the purpose of scribed longitudinal lines 31 on tape 10 corresponding to the locations of pitch graduations 26 serve the purpose, among others, of preventing confusion and making settings and readings easier.

Having locked slide 11 in place, the rafter man is then ready to measure the jack rafter cuts for the hip roof. He sets the perpendicular member 24 of slide 11 at the edge of the rafter (or, if he wishes he may use the width of slide 11 to compensate for center beam width) and then looks up the tape at the 24" mark. At the 24" mark and continuing up the scale on the bottom edge 15 are the cutting marks 27. The rafter man simply marks the rafter at the cutting mark 27 numbered 4, which corresponds to our assumed pitch for this example. Of course, in all cases, the marks 27 numbered with the required pitch will be used. The successive jack rafters are then marked in a similar manner. The successive sets of cutting marks 27 are spaced at predetermined intervals throughout tape 10 so that all the rafter man has to do is to continue unwinding the tape until, for this example, he has completed his 6 jack rafter cuts. The distance between the 1 and 5 marks of the cutting marks 27 will be greater as the length increases. Both the pitch graduations 26 and the cutting marks 27 are graphed mathematically with respect to each other, so that they are set so that the length of the cuts for a particular pitch agree with the existing calculations.

The rafter measuring tape of the present invention is set up to measure the length of the rafters from the edge of the building to the apex of the roof with respect to the pitch. As indicated, many buildings have a center beam or ridge-pole (normally 1½" thick), and this must be taken into account and half this thickness must be subtracted from the cut mark (as mentioned for the reason for the preferred ¾" width of slide 11). Also, for buildings that have an overhang, it is noted that the overhang distance must be added to the cut mark, and this can be done in any appropriate or standard manner. Therefore, normally, after having made the various adjustments for the left over inches, the overhang, and the center beam width, a single marking will be sufficient for laying out all the succeeding rafters.

Referring to the aforementioned cutting marks (not shown) appearing along the upper edge 16 of tape 10, said marks are for use in cutting hip and valley rafters. Preferably on the back side 30 of tape 10 is another similar (but more extended) scale containing numbers 1 to 24 with their respective pitch lines (not shown) laid out to correspond with the calculating tables and formulas for hip and valley rafters (for which, as those skilled in the art are aware, pitch is figured on "17's" instead of "12's"). Although the indicia on the back side 30 roughly corresponds with that of the face side 29, the pitch denominator being different (i.e. 17 instead of 12), the scale is expanded so that in actual dimensions the 24"-mark on the back side 30 equals approximately the 34" mark on face side 29. The aforementioned procedure, then, is followed to measure the length of the hip or valley rafters, except that slide 11 is placed in its appropriate position with reference to the back side 30 of tape 10. Having positioned slide 11, tape 10 is turned over to its face side 29, and said cutting marks along the upper edge 16 are used for laying out the hip or valley rafters.

It is readily apparent from the preceding description that even one only slightly familiar with rafter cutting can easily and accurately cut jack rafters and other rafter cuts using the rafter measuring tape of the present invention.

While there has been illustrated and described herein a preferred embodiment of the present invention, it will be understood, of course, that various changes and modifications may be made in the details thereof without departing from the scope of the invention as set forth in the appended claims.

What is claimed is:

1. A rafter measuring tape adapted for marking rafter lengths, comprising: A measuring tape member including scribed indicia readable longitudinally on at least one side thereof; and a slide member slidably connected to said measuring tape, said slide member including scribed indicia readable transversely to said measuring tape; said measuring tape comprising a flexible metal tape of the type stored wound on a tape reel mounted in a housing; said slide member being fixedly positionable on said measuring tape; and said slide member comprising a U-shaped member the slot of which encloses said measuring tape and the open ends of which are connected, beyond the side of said enclosed measuring tape toward said open ends of said U-shaped member, by a threaded stud and wing nut.

2. A rafter measuring tape for marking cuts of rafters in roof construction in accordance with a selected pitch and roof size, comprising: A flexible resilient tape of the type adapted to be wound on a tape reel in a housing, said flexible resilient tape including a first scale and a second scale; a slide member longitudinally positionable on said flexible resilient tape, said slide member including a third scale adapted to register with said first scale; graduations on said first scale representing starting points from which to measure jack rafters cuts for an assortment of pitches and "left over inches"; graduations on said second scale representing marks for cutting successive jack rafters for said assortment of pitches; and graduations on said third scale representing roof pitch.

3. The rafter measuring tape of claim 2 wherein said first scale is located on the first two feet of said tape and said second scale is located from the beginning of the third foot of said tape to the end of said tape.

4. The rafter measuring tape of claim 2 wherein said slide member comprises a U-shaped member the slot of which encloses said measuring tape and the open ends of which are connected, beyond the side of said enclosed measuring tape toward said open ends of said U-shaped member, by a threaded stud and wing nut.

5. The rafter measuring tape of claim 2 wherein said first scale comprises curved line graduations and said second scale comprises straight line graduations perpendicular to the length of said measuring tape and said third scale comprises straight line graduations parallel to the length of said measuring tape.

References Cited by the Examiner

UNITED STATES PATENTS

| | | | |
|---|---|---|---|
| 499,521 | 6/1893 | Dahmer | 33—111 |
| 877,934 | 2/1908 | Lea | 33—173 |
| 1,396,308 | 11/1921 | Wilson | 33—111 |
| 1,643,166 | 9/1927 | Martin | 33—137 |
| 2,569,454 | 10/1951 | Cole | 235—70 |

ROBERT B. HULL, *Primary Examiner.*

ISAAC LISANN, *Examiner.*

B. DONAHUE, *Assistant Examiner.*